United States Patent [19]

Caudill et al.

[11] 4,380,244
[45] Apr. 19, 1983

[54] HOSE CONTROL SYSTEM

[75] Inventors: Stanley D. Caudill; Frederick R. Goode, both of Lexington, Ky.

[73] Assignee: FMC Corporation, Chicago, Ill.

[21] Appl. No.: 240,726

[22] Filed: Mar. 5, 1981

[51] Int. Cl.³ ............................................. F16L 33/00
[52] U.S. Cl. .................................. 137/355.16; 52/115; 137/355.17; 137/355.24; 212/268; 242/47.5; 414/718; 414/918
[58] Field of Search ............................... 52/115, 118; 137/355.16, 355.17, 355.2, 355.24; 212/266, 267, 268; 242/47.5; 414/718, 918

[56] References Cited

U.S. PATENT DOCUMENTS 3,042,234 7/1962 Davis .
3,056,510 10/1962 Garnett .
3,305,220 2/1967 Nevulis .
4,034,875 7/1977 Puch et al. .
4,039,032 8/1977 Morrison .
4,125,974 11/1978 Kay et al. .

Primary Examiner—Gerald A. Michalsky
Attorney, Agent, or Firm—A. J. Moore; R. B. Megley

[57] ABSTRACT

An arrangement for keeping taut and untangled the hoses of the hydraulic system of the telescoping booms of a crane includes a wheel around which the hose is trained and a cable by which the hose can be stretched and pretensioned so that the resiliency of the hose itself maintains the conformity of the hose to the wheel.

2 Claims, 6 Drawing Figures

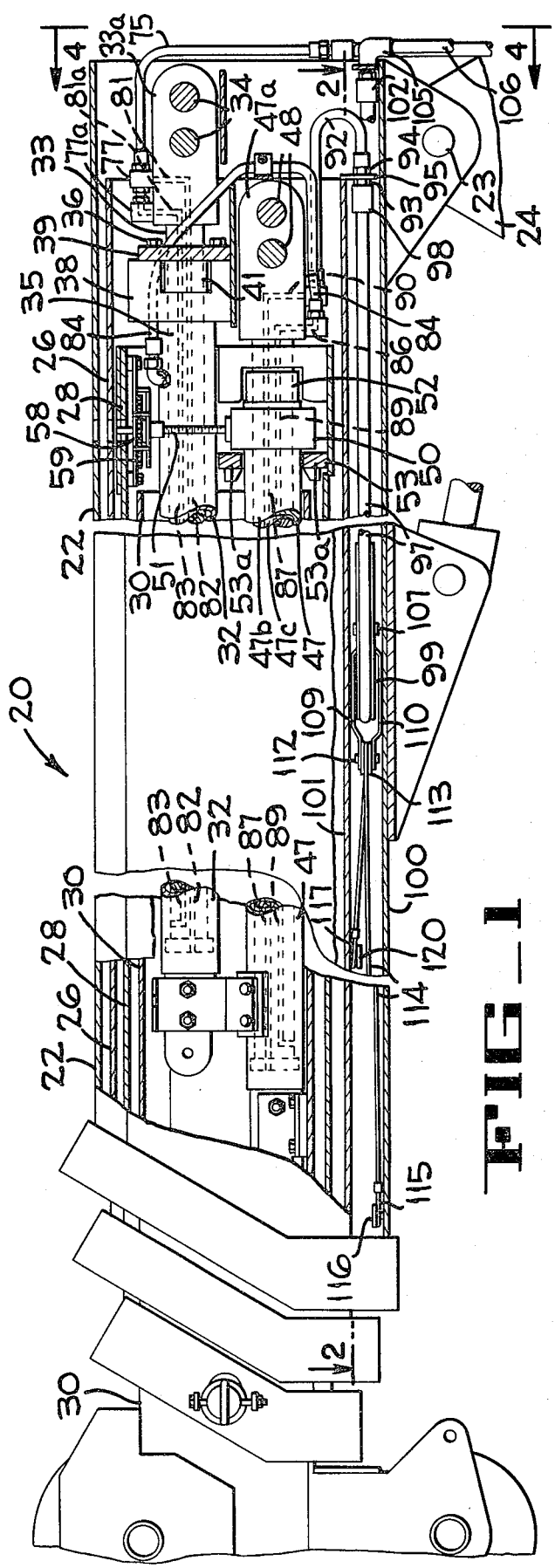
FIG_1
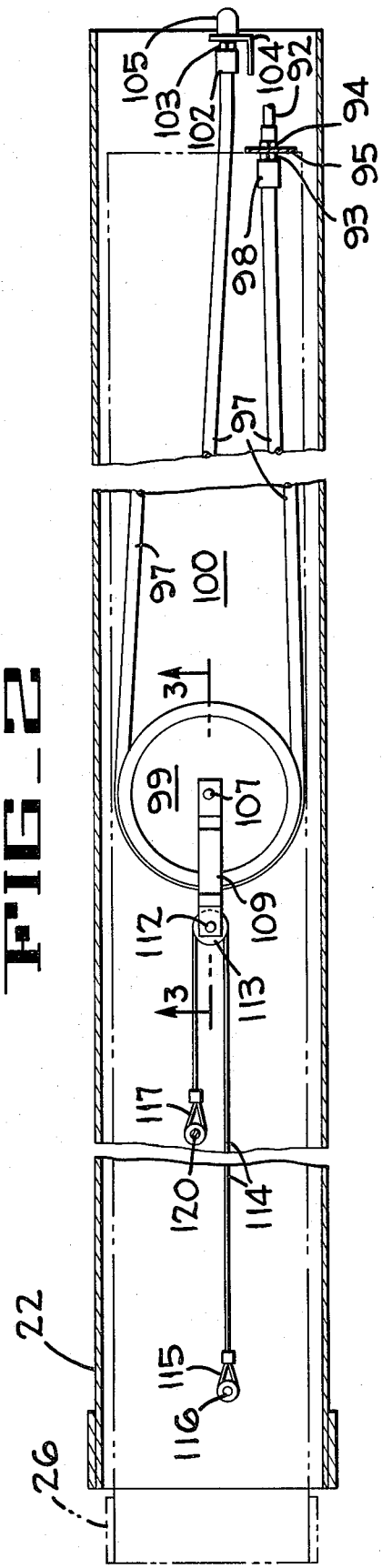
FIG_2

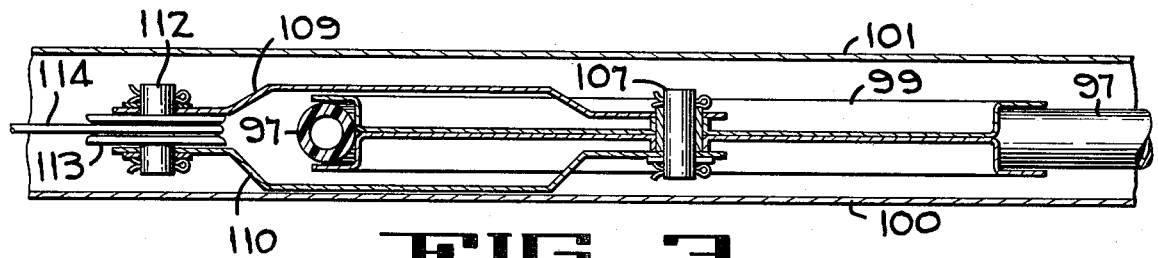
FIG_3
FIG_4
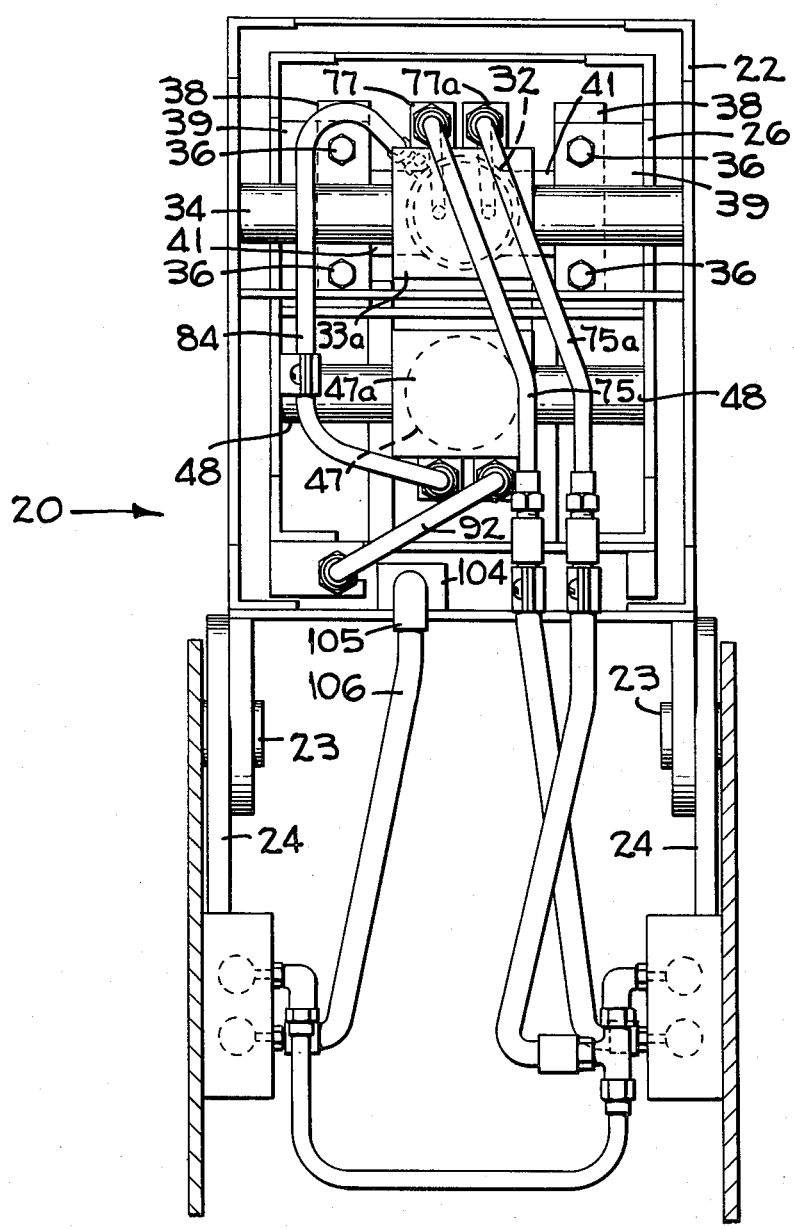

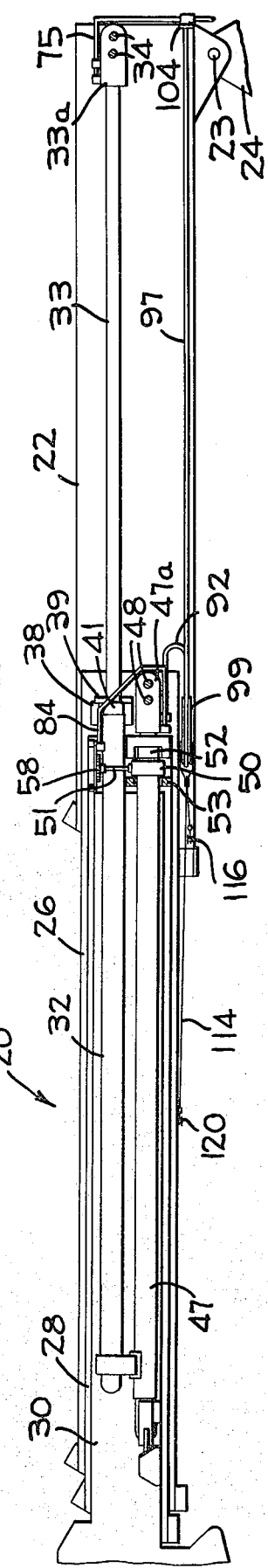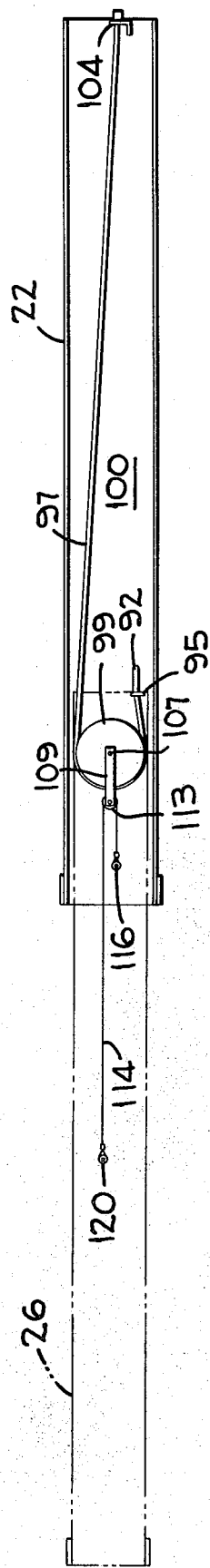

HOSE CONTROL SYSTEM

BACKGROUND OF THE INVENTION

This invention relates to a hydraulic system for controlling the telescoping boom sections of a crane and more particularly concerns an improved apparatus for preventing the hoses of the hydraulic system from becoming fouled and tangled.

One of the problems encountered in cranes having telescoping boom sections has been the difficulty involved in retracting and paying-out the hose of the hydraulic system during the telescoping of the boom sections. Heretofore various types of reel and travelling pulley arrangements have been employed to prevent the fouling and kinking of the hydraulic hoses with varying degrees of success. The U.S. Pat. No. 3,305,220 to Nevulis discloses a travelling carriage; the U.S. Pat. No. 3,056,610 to Garrett discloses a spring-loaded pulley arrangement; and the U.S. Pat. No. 4,125,974 to Kay et al discloses a pulley disposed between adjacent walls of adjacent telescoping boom sections and a spring-loaded cable system for maintaining a pulling force on the pulley to keep the hose taut and in an untangled condition during relative movement of the boom sections. It is evident that in any mechanism used in heavy outdoor machinery, such as cranes, it is an advantage to have as few parts that require adjustment, servicing and replacement as possible. Springs that change their spring rate over a period of time or rust-up due to exposure to the elements could result in an unacceptable amount of down-time for a crane.

It is an object of the present invention to provide a hose take-up system which has a minimum of parts and is effective to keep the hose under tension without the use of springs.

SUMMARY OF THE INVENTION

The hose take-up system takes advantage of the fact that the hose being used has some resilience when subjected to a force tending to elongate it, and generally comprises a wheel around which the hose may be trained, and a cable by which a pull can be exerted on the wheel to elongate the hose just prior to the opposite ends of the cable being secured to two relatively movable boom sections.

DESCRIPTION OF THE DRAWINGS

FIG. 1 is a fragmentary side elevation, with parts broken away, of a crane boom having telescoping boom sections and a hose tensioning device constructed in accordance with the teaching of the present invention.

FIG. 2 is an enlarged section taken along line 2—2 of FIG. 1 with a boom wall that is above the plane of the section being shown in phantom lines.

FIG. 3 is an enlarged section taken along line 3—3 of FIG. 2.

FIG. 4 is an end elevation, with parts in section of the crane of FIG. 1, the view being taken looking in the direction of arrows 4—4 of FIG. 1.

FIG. 5 is a schematic side elevation of the crane boom of FIG. 1, illustrating a condition in which the inner mid-section of the boom has been moved outwardly away from the base, carrying the other sections outwardly with it.

FIG. 6 is a schematic view showing the position of the cable-tensioning device when the inner mid-section is in the position of FIG. 5.

DESCRIPTION OF A PREFERRED EMBODIMENT

In FIG. 1 the reference numeral 20 indicates generally a boom of a crane which has a base section 22 that is rectangular in cross-section and is pivotally mounted at 23 on a support such as 24. An inner mid-section 26, of generally rectangular cross section, is mounted in telescoping relation inside base section 22, and an outer mid-section 28, which is also rectangular in cross-section, is mounted in telescoping relation in the inner mid-section 26. A tip section 30 is telescoped within the outer mid-section 28. The inner mid-section 26 is extended relative to the base section 22 by means of a power unit 32 which has a block 33a, that is secured to the end of the piston rod 33. Block 33a is secured by pins 34 to an abutment that is secured to the inner walls of section 22, as by welding. The cylinder case 35 of power unit 32 is secured to the inner mid-section 26 by two C-shaped bars 38, one on each side of the cylinder case (one bar only being shown). Each bar is secured by two capscrews 36 to a plate 39. A yoke, which is welded to the cylinder case 35, is provided with two ears 41 (one only being shown). The ears 41 project in opposite directions from the cylinder case and each ear is trapped between one of the plates 39 and the rear wall of one of the C-shaped bars 38. Similarly, the outer mid-section 28 of the boom is extended relative to the inner mid-section 26 by means of a power unit 47 that carried at its rod end 47a two pins 48 that are anchored in abutments secured to the inner walls of section 26. The cylinder case 47b of unit 47 is arranged to be selectively connected and disconnected to the inner end of outer mid-section 28 by a pair of bars 50 (one only being shown), each of which is carried on the lower end of a screw 51. As the screw is rotated, the bar is raised or lowered from the lowered position of FIG. 1, where it is positioned between one of two oppositely projecting ears 52 secured to the cylinder case and one of two rigid C-shaped abutment members 53 (one only being shown), each of which is secured to an adjacent wall of boom section 28 and has ears 53a extending partway around the case, and a raised position wherein the lower edge of the bar is above the ears 53. A small gear 58 is keyed to the upper end of each screw 51 and the two small gears are in mesh with a larger gear 59. A crank (not shown) that is insertable through aligned openings in the boom sections 22, 26 and 28 is adapted to engage a socket secured to the center of the large gear 59. Accordingly, by rotating the crank, both screws can be simultaneously raised or lowered.

Pressurized fluid is supplied to power unit 32 by a pair of conduits 75 and 75a (FIG. 4) that are connected to a supply of such fluid and to the rod end 33a of the unit 32 through separate fittings 77 and 77a. The rod end 33a and the rod 33 have communicating internal passages 81 and 82, respectively, through which fluid is directed from fitting 77 to the outer end of the cylinder 32. A second passage 81a in the rod end 33a communicates with passage 83 in the rod to direct oil to the retract side of the cylinder case 35. A conduit 84 is connected between the cylinder case 35 and the rod end 47a of the power unit 47. The piston rod 47c of the power unit 47 and the rod end 47a have communicating passages 89 and 86, respectively, through which fluid is directed to the retract side of cylinder case 47b. A second passage 87 in the rod 47c communicates with a passage 90 in the rod end 47a which, in turn, communicates with a conduit 92. At one end, the conduit 92 is connected to the rod end 47a and at its other end it is anchored by a pair of lock nuts 93 and 94 in a bracket 95 carried by the inner mid boom section. A flexible conduit 97 is connected in flow communication with the anchored end of conduit 92 by a fitting 98 and is trained around a wheel 99 (FIG. 2) which is disposed in the space between one wall 100 (FIG. 1) of the base section 22 and an adjacent wall 101 of the inner mid-section 26. At its other end, the flexible conduit 97 is connected by fitting 102 to a nipple that anchored to a bracket 104 carried by the base section 22 between a lock nut 103 and an elbow fitting 105. A conduit 106, which leads to a reservoir, is connected to elbow 105 and communicates with the conduit 97.

The wheel 99 is freely rotatable on an axle 107 (FIG. 3) carried between opposed ends of two rigid straps 109 and 110 which carry a pin 112 between their other ends. A pulley 113 is rotatable on pin 112, and a cable 114 is trained around pulley 113. The cable is provided at one end with a loop 115 (FIG. 2) that is adapted to be disposed over a pin 116 carried by and projecting inwardly from wall 100 of the base section 22 and, at the other end, the cable has a loop 117 which is adapted to be placed over a pin 120 projecting outwardly from the wall 101 of the inner mid-section 26.

The cable and hose assembly are positioned between the walls 100 and 101 before the hose 97 has been connected to the conduits 92 and 106, and at a time when the inner mid-section 26 has been extended relative to the base and elevated. To aid in the positioning of the cable and hose assembly, the ends of the cable can be tied together, and the ends of the hose can be tied together. Also, a wire can be attached to the conduit at the point where its ends are tied together. The hose end of the cable and hose assembly and the wire is first inserted between the base and the lower wall of the inner mid-section at the forward end of the base. End 115 of the cable is looped over the pin 116 to attach the cable to the base. Section 26 is retracted while the wheel is pulled downwardly through the base using the wire attached to the conduit. When the conduit ends can be reached through the rear of the boom sections, they are untied and secured to the connectors 98 and 102. Section 26 is then extended until pin 120 is outside the base and the loop 117 is placed over this pin.

It is a feature of the present invention that the conduit 97 is capable of being resiliently elongated when put under tension.

This conduit is made of a composition rubber and synthetic fiber and is marketed by Samuel Moore & Company of Mantua, Ohio. In one successful installation, the conduit was approximately 34 feet long and ¾ of an inch in inside diameter, and was capable of being stretched approximately 15¾ inches when subjected to a pull of 250 pounds by a portable jack mounted near the end of the base section 22 of the boom. With such a tension placed on the conduit, it did not take a permanent set but maintained its resiliency and its conformity to the wheel 99 as the boom section 26 moved in and out of the base 22.

During operation, when all sections of the boom are in the fully retracted position of FIG. 1, the relative positions of the conduit 97, the cable 114, the wheel 99, the pin 116 projecting upwardly from the stationary base section 22, and the pin 120 projecting downwardly from the inner mid-section 26 are substantially as indicated in FIG. 2. When pressurized fluid is directed to cylinder 32 to extend that cylinder, the inner mid-section 26 moves outwardly relative to the base 22, carrying boom sections 28 and 30 with it. During this outward movement of section 26, the pin 120 moves outwardly toward the position indicated in FIG. 6. Since pin 116 is stationary, the wheel 99 moves bodily outwardly under the urging of the cable 114 while it rotates about its axis to permit the conduit to lengthen the section connected to the base while shortening the section connected to the inner mid-section 26. During these adjusting movements the tension in the conduit 97 causes it to maintain its conformity to the wheel.

In a boom of the type shown in FIG. 1, provision is made for extending the outer mid-boom section 28 and the tip section 30, however, since the conduit control system of the present invention comes into action only during the movements of the inner mid-section 26 relative to the base section 22, no description of the apparatus for extending the other sections will be included herein. A complete description of this apparatus will be founded in the application of Frederick R. Goode et al filed on even date herewith and identified Ser. No. 240,727, and such description is included by reference herein.

Pressurized fluid is directed to the power cylinders of the boom of FIG. 1 from a source of pressurized fluid through a conventional hydraulic control system.

What is claimed to be new and desired to be protected by Letters Patents is:

1. In a boom structure wherein a first boom section is mounted for movement relative to a second boom section and a freely rotatable guide wheel is positioned between adjacent walls of said sections; the improvement which comprises:
 a flexible resilient conduit disposed around said wheel;
 means anchoring one portion of said conduit to said first section and another portion to said second section;
 non-resilient connecting means resisting a pull of sufficient force on said wheel in a direction to stretch said resilient conduit a sufficient amount to provide a conduit tensioning force sufficient to maintain said conduit taut on said wheel during relative movement of said boom sections;
 said first and second boom sections each including a lower wall, which walls are spaced from each other, and wherein;
 said guide wheel, said resilient flexible conduit and said means resisting a pull on said wheel are all disposed between said lower walls.

2. In a boom structure wherein a first boom section is mounted for movement relative to a second section and a freely rotatable guide wheel is positioned between adjacent walls of said sections; the improvement which comprises:
 a flexible resilient conduit disposed around said wheel;
 means anchoring one portion of said conduit to said first section and another portion to said second section;
 non-resilient connecting means resisting a pull of sufficient force on said wheel in a direction to stretch said resilient conduit a sufficient amount to provide a conduit tensioning force sufficient to maintain said conduit taut on said wheel during relative movement of said boom sections;

said pull resisting means including a cable having one end fixedly connected to said first boom section and an opposite end fixedly connected to said second boom section;

said conduit tensioning force exerted by said resilient conduit is the only significant resilient force for maintaining said conduit taut on said wheel;

said first and second boom sections each including a lower wall, which walls are spaced from each other, and wherein, said guide wheel, said resilient flexible conduit and said means resisting a pull on said wheel are all disposed between said lower walls.

* * * * *